(12) United States Patent
Grassi

(10) Patent No.: US 9,097,598 B2
(45) Date of Patent: Aug. 4, 2015

(54) TORQUE SENSOR

(76) Inventor: Michael J. Grassi, Duluth, MN (US)

(*) Notice: Subject to any disclaimer, the term of this patent is extended or adjusted under 35 U.S.C. 154(b) by 485 days.

(21) Appl. No.: 13/550,932

(22) Filed: Jul. 17, 2012

(65) Prior Publication Data

US 2013/0024137 A1 Jan. 24, 2013

(51) Int. Cl.
*G01L 3/10* (2006.01)
*G06F 19/00* (2011.01)
*G01L 1/00* (2006.01)
*G01L 3/04* (2006.01)

(52) U.S. Cl.
CPC . *G01L 3/108* (2013.01); *G01L 1/00* (2013.01); *G01L 3/04* (2013.01)

(58) Field of Classification Search
CPC ........... G01L 3/04; G01L 25/003; G01L 1/00; G01L 3/00; G01L 3/108
USPC ............... 702/43, 44, 94; 73/146, 115.07, 73/862.631, 826.627, 826.338, 826.041; 74/594.2
See application file for complete search history.

(56) References Cited

U.S. PATENT DOCUMENTS

| | | | |
|---|---|---|---|
| 5,186,042 A * | 2/1993 | Miyazaki | 73/115.07 |
| 5,361,649 A * | 11/1994 | Slocum, Jr. | 74/594.2 |
| 6,032,520 A * | 3/2000 | Miyazaki | 73/115.07 |
| 6,138,505 A * | 10/2000 | Miyazaki | 73/146 |
| 6,356,847 B1 | 3/2002 | Gerlitzki | |
| 6,356,848 B1 | 3/2002 | Cote et al. | |
| 6,418,797 B1 | 7/2002 | Ambrosina et al. | |
| 6,629,574 B2 * | 10/2003 | Turner | 180/206.4 |
| 6,832,512 B2 * | 12/2004 | Miyazaki | 73/146 |
| 7,055,382 B2 * | 6/2006 | Miyazaki | 73/146 |
| 7,775,128 B2 | 8/2010 | Roessingh et al. | |
| 8,011,242 B2 * | 9/2011 | O'Neill et al. | 73/379.01 |
| 8,117,923 B2 * | 2/2012 | Sasaki | 73/862.49 |
| 8,387,470 B2 * | 3/2013 | Tuulari et al. | 73/862.627 |
| 2006/0120208 A1 | 6/2006 | Kim | |
| 2007/0000336 A1 * | 1/2007 | Berdichevsky et al. | 73/862.324 |
| 2009/0120208 A1 | 5/2009 | Meyer | |
| 2010/0006760 A1 | 1/2010 | Lee et al. | |
| 2010/0024590 A1 * | 2/2010 | O'Neill et al. | 74/594.1 |
| 2010/0093494 A1 * | 4/2010 | Smith | 482/8 |
| 2010/0263468 A1 * | 10/2010 | Fisher et al. | 74/469 |
| 2010/0282001 A1 * | 11/2010 | Sasaki | 73/862.49 |

(Continued)

FOREIGN PATENT DOCUMENTS

| | | | |
|---|---|---|---|
| DE | 4435174 A1 * | 3/1996 | |
| EP | 0 386 005 B1 | 9/1990 | |

(Continued)

OTHER PUBLICATIONS

Hack, Keith, blog titled "V3—Power Meter—The Complete How To", dated Jan. 16, 2013, pp. 1-7 http://Keithhack.blogspot.com.

(Continued)

*Primary Examiner* — Carol S Tsai
(74) *Attorney, Agent, or Firm* — Fay Sharpe LLP

(57) ABSTRACT

A torque sensor for a human-powered object includes a spindle connecting crank arms of the object. In one embodiment, the object can be a bicycle. The torque sensor further includes at least one strain gauge mounted to the spindle in a shear pattern to measure shear strain perpendicular to a radius of the spindle. In some embodiments, the torque sensor further includes a carrier fixed to a hollow interior of the spindle, where at least one strain gauge is mounted to the spindle via the carrier. Advantageously, the torque sensor provides a low cost method to measure power.

19 Claims, 7 Drawing Sheets

(56) References Cited

U.S. PATENT DOCUMENTS

2011/0041626 A1* 2/2011 Tuulari et al. ............ 73/862.627
2012/0090424 A1* 4/2012 Curran et al. ................ 74/594.4

FOREIGN PATENT DOCUMENTS

| EP | 0 909 940 A2 | 4/1999 |
| EP | 0 909 940 A3 | 3/2000 |
| EP | 1 978 343 A2 | 10/2008 |
| EP | 1 978 343 A3 | 11/2009 |
| GB | 2216671 A * | 10/1989 |
| WO | WO 89/00401 | 1/1989 |
| WO | WO 2010/000369 A1 | 1/2010 |
| WO | WO 2010/088888 A2 | 8/2010 |

OTHER PUBLICATIONS http://keithhack.blogspot.com/2013/01/v3power-meterthe-complete-how-to.html, Keith Hack "V3-Power Meter—The Complete How To", pp. 1-7, dated Jan. 16, 2013.

BikeRadar.com, James Huang, "Ashton Instruments previews US$500 power meter", pp. 1-7, dated Sep. 10, 2014.

http://www.dcrainmaker.com/2014/09/4iiiis-introduces-precision.html, DC Rainmaker, 4iiii's Introduces $399 Power Meter, Precision: My First Ride With It, pp. 1-21 of 51, dated Sep. 9, 2014.

http://www.ergomo-systems.de/p-r-o-d-u-k-t/, "The Ergomo Systems", pp. 1-2, downloaded Sep. 30, 2014.

http://www.ergomo-systems.de/sensoraufbau/, "Analysis & Optimization", pp. 1-2, downloaded Sep. 30, 2014.

http://www.ergomo-systems.de/sensoraufbau/, measurement principle.pdf, 1 page, downloaded Sep. 30, 2014.

BikeTechReview.com: 2011 Power Meter Review, An Engineer's Perspective, Jan. 1, 2011, pp. 1-39.

International Preliminary Report on Patentability and Written Opinion of International Patent Application No. PCT/US2012/047079, Dated Jan. 21, 2014.

International Search Report and Written Opinion dated Nov. 2, 2012.

* cited by examiner

TORQUE SENSOR

This application claims priority to and the benefit of the filing date of U.S. Provisional Patent Application No. 61/508,793, filed Jul. 18, 2011, which application is hereby incorporated by reference.

BACKGROUND

The present exemplary embodiments relate to torque sensing. The present exemplary embodiments find particular application in conjunction with power meters for human-propelled vehicles, such as bicycles, and will be described with particular reference thereto. However, it is to be appreciated that the present exemplary embodiments are also amenable to other like applications. For example, the present exemplary embodiments find application in suspension systems, power assisted bikes, chain derailleur shifting, other human powered objects, such as hand cranks and torque wrenches, and so on.

Current power meters employ a number of different approaches to measuring power. Some approaches measure power using deflection measurements in the crank spindle, otherwise known as the bottom bracket. U.S. Pat. No. 6,356,847 to Gerlitzski uses two optoelectronic sensors located on the bottom bracket to measure deflection in the crank spindle. EP Patent Application No. 1978343 to Etsuyoshi et al. uses a magneto resistive material arrangement with several cylindrical sleeves on the bottom bracket to measure deflection. U.S. Patent Publication No. 2010/0006760 to Glueck et al. senses magnetization changes due to the bottom bracket deflecting. U.S. Patent Publication No. 2010/0093494 to Smith employs strain gauges on a specially designed crankset and spindle to measure deflection.

A number of other approaches to measuring power also exist. U.S. Patent Publication No. 2009/0120208 to Meyer and EP Patent No. 0386005 to Schoberer measure power in the crank spider of a bicycle using strain gauges. U.S. Pat. No. 6,356,848 to Cote et al. measures power by vibrational tension methods in the chain using an acoustic sensor. U.S. Pat. No. 6,418,797 to Ambrosina et al. measures power in the rear hub using strain gauges. WO Patent Publication No. 2010/000369 to Redmond et al. measures power using strain gauges integrated into the cleat of a rider's shoe. Systems are also known which measure power using strain gauges located in the rear wheel, sensors to indirectly measure power based on Newton's third law, and strain gauges based on bending moment deflections in the pedal spindle during cycling.

While a number of different approaches to measuring power exist, they all have room for improvement. Approaches based on deflection measurements are challenging because bending strains and torsion strains occur simultaneously and the bending strains are equal to, if not greater than, the torsion strains. Decoupling these strains is complicated and often times costly. Pedal-based approaches are known to be expensive. Approaches directly measuring power require that the manufacturer do calibration, which is costly and time consuming. Thus, there is a need for a low cost power meter that can be calibrated by the operator and includes a low cost, accurate and direct power sensor.

The present exemplary embodiments provide an improved power meter and sensor which overcome the above-referenced problems and others.

BRIEF DESCRIPTION

In accordance with one aspect of the present application, a torque sensor is provided. The torque sensor includes a carrier which can be mounted to an associated spindle connected to at least one crank arm of an associated torqued object. The torque sensor further includes a strain gauge grid mounted to the carrier in a shear pattern to measure shear strain in a direction perpendicular to a radius of the associated spindle.

In accordance with another aspect of the present application, a power measuring unit is provided. The power measuring unit includes a torque sensor and a processor. The torque sensor includes a carrier which can be mounted to an associated spindle connecting crank arms of a human-powered object. The torque sensor further includes a strain gauge grid mounted to the carrier in a shear pattern to measure shear strain from torsional forces. The processor is programmed to receive strain data from the torque sensor and measure torque from the received strain data. Further, the processor is programmed to provide power data calculated from the measured torque to a receiving device.

In accordance with another aspect of the present application, a torque sensor is provided. The torque sensor includes a shaft and a pair of strain gauge grids. The pair of strain gauges are mounted to the shaft in a shear pattern to measure shear strain in a direction perpendicular to a radius of the shaft and electrically connected in a Wheatstone Bridge arrangement to measure shear strain from torsional forces whilst negating shear strain from bending forces.

In accordance with another aspect of the present application, a bicycle is provided. The bicycle includes a pair of crank arms connected by a spindle. Further, the bicycle includes a torque sensor. The torque sensor includes a strain gauge oriented to measure strain at 45 degrees to an axis of the spindle and perpendicular to a radius of the axis.

DETAILED DESCRIPTION

Figure 1:
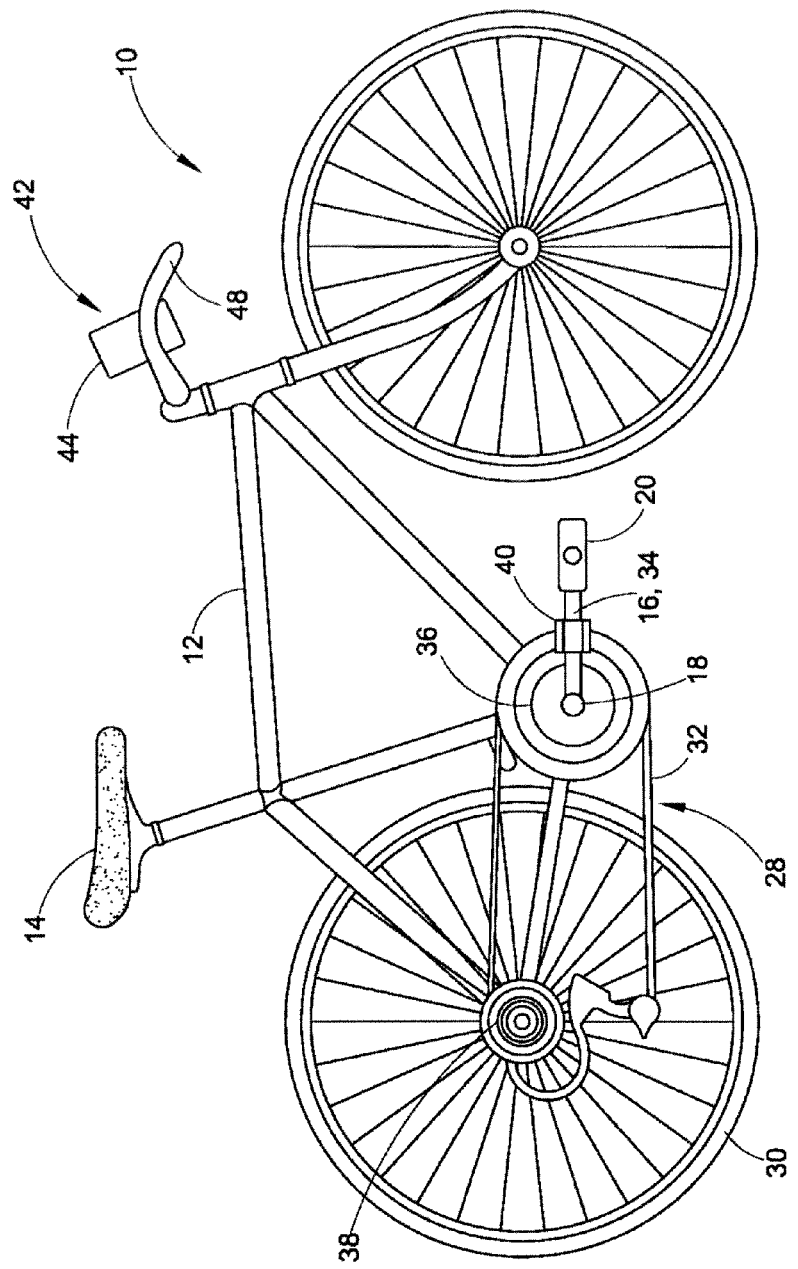
FIG. 1 is a perspective view of a bicycle.
Figure 2:
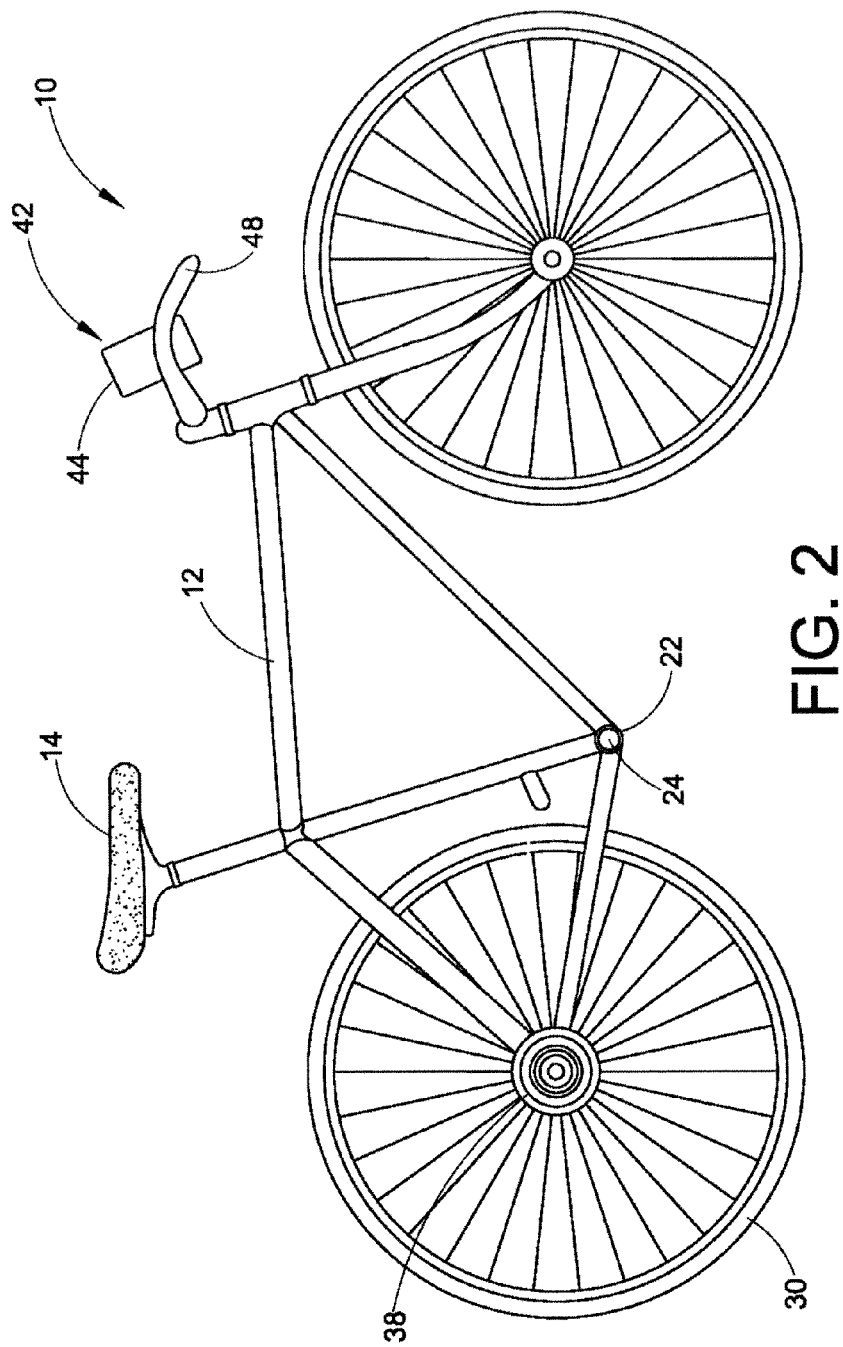
FIG. 2 is a perspective view of a bicycle less a power transfer system and a torque sensor.

With reference to FIGS. 1 and 2, a human-propelled, wheeled vehicle 10, such as a bicycle and so on, includes a frame 12 and a human support 14, such as a seat, mounted to the frame 12. The support 14 supports an operator of the human-propelled vehicle 10 and positions the human operator within arm's reach or leg's reach of a pair of crank arms 16 rotably mounted to the frame 12. The crank arms 16 rotate about a common axis 18, typically perpendicular to the mid-sagittal plane of the operator, and transform reciprocating motion of the operator's arms or legs into rotary motion. In some embodiments, a pair of human interfaces 20 mounts to the crank arms 16 to aid the operator in rotating the crank arms 16. Human interfaces 20 can include, for example, pedals, hand grips, and so on.

The crank arms 16 rotably mount to the frame 12 via a shell 22 (FIG. 2), such as a bottom bracket shell, of the frame 12.

The shell 22 includes a hollow region 24 disposed between a first open end and a second open end. In some embodiments, the shell 22 is cylindrical in shape. A torque sensor 26 (FIGS. 3A and 3B) extends through the hollow region 24 of the shell 22 and operatively connects the crank arms 16, one at each open end of the shell 22, to one another. For example, the crank arms 16 can be mechanically connected to the torque sensor 26. As discussed in detail hereafter, the torque sensor 26 measures torque about the common axis 18.

A power transfer system 28 mounted to the frame 12 transfers the rotary motion of the crank arms 16 to a drive system 30 mounted to the frame 12. The transfer may be performed electrically, mechanically, and so on. For example, the power transfer system 28 may include a generator that transforms the rotary motion to electrical power employed by the drive system 30. As another example, the power transfer system 28 may include a belt and/or chain 32 transferring the rotary motion to the drive system 30. In some embodiments, the crank arms 16 include a drive crank arm 34 and a non-drive crank arm (not shown). The drive crank arm 34 is the crank arm from which rotary motion is transferred. For example, where the rotary motion is mechanically transferred with the belt and/or chain 32, the drive crank arm 34 is the crank arm with chainrings 36 connected thereto.

The drive system 30 receives power from the power transfer system 28 and propels the human-propelled vehicle 10 therewith. The drive system 30 can include, for example, a wheel, a propeller, a rotor, and so on. Further, in some embodiments, the drive system 30 may further include a sprocket or the like 38 for receiving the mechanical power from the power transfer system 28. Additionally, in some embodiments, the drive system 30 may further include an electric motor for receiving electrical power from the power transfer system 28.

The human propelled vehicle 10 can further include a sensor detection unit 40 and a receiving device 42, optionally, having a display 44. The sensor detection unit 40 calculates power based on data received, typically over a first, wired communication link, from the torque sensor 26. Additionally, or alternatively, the sensor detection unit 40 stores the received data and/or calculated power data locally in a memory, and/or transmits the received data and/or calculated power data to the receiving device 42 over a second communication link. Typically, the second communication link is a wireless communication link. However, the second communication link can be a wired communication link, such as a universal serial bus (USB) communication link. In some embodiments, the second communication link is further employed to write and/or otherwise update firmware of the sensor detection unit 40. The receiving device 42 receives the data over the second communications link, and one or more of stores the received data in a local memory and displays the received data on the display 44. The display 44 is, for example, one of an LCD display, an LED display, a plasma display, a projection display, a touch screen display, and the like. The receiving device 42 is, for example, a mobile device, such as an iPhone®.

The sensor detection unit 40 and/or the receiving device 42 are typically removably mounted to the frame 12 so they can be moved from one human-propelled vehicle to another. For example, the sensor detection unit 40 can be removably mounted in a hollow space 46 (FIG. 3A) of the torque sensor 26 or to the crank arms 16. As another example, the receiving device 42 can be removably mounted to a steering device 48, such as a wheel, handle bars, and so on, of the human-propelled vehicle 10. In some embodiments, the receiving device 42 is integrated in to the sensor detection unit 40.

Figure 3:
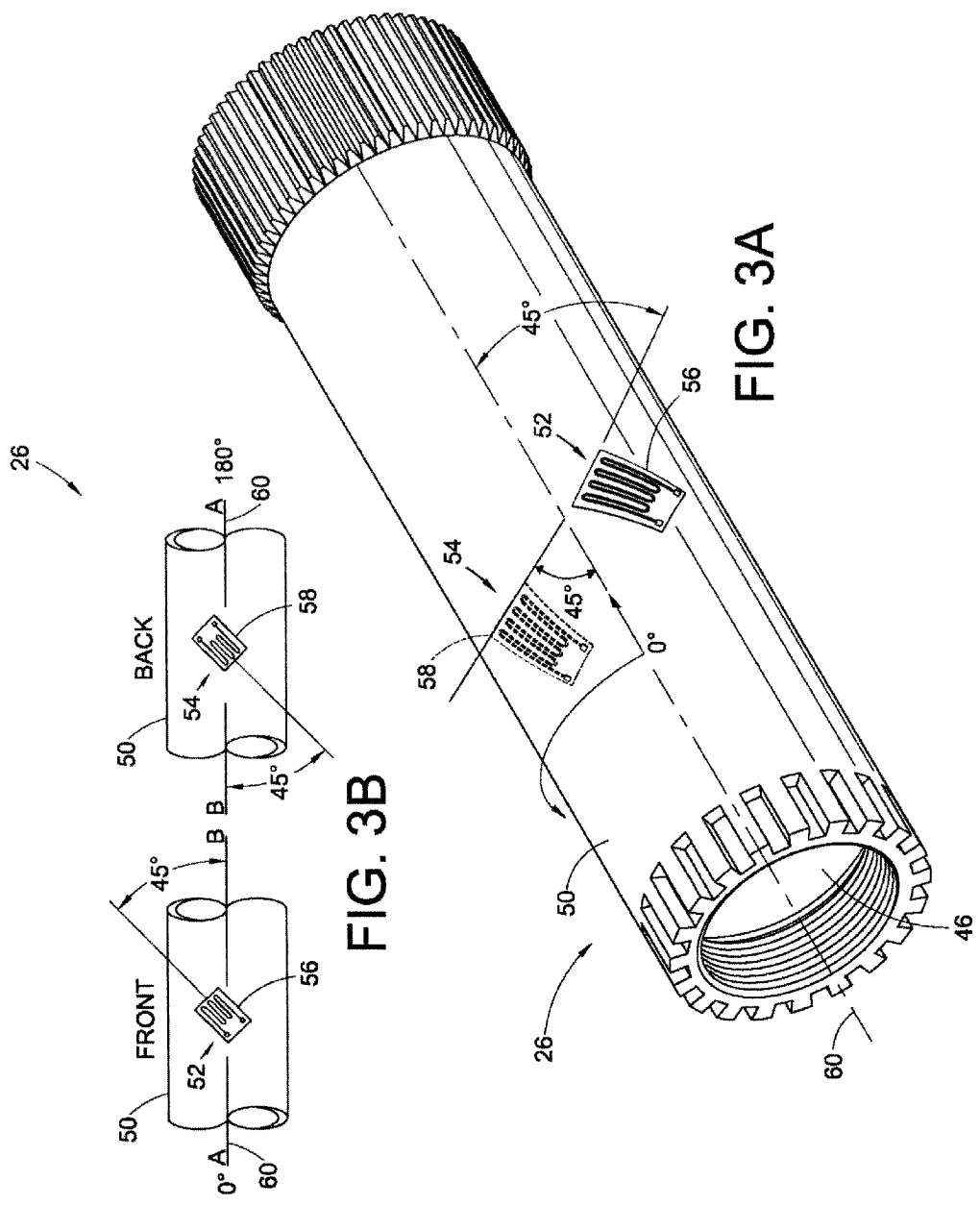
FIG. 3A is a perspective view of a torque sensor according to aspects of the present disclosure.
FIG. 3B is a perspective view of the front and back of the torque sensor of FIG. 3A.

With reference to FIGS. 3A and 3B, the torque sensor 26 includes a spindle 50 and at least one strain gauge 52, 54 mounted to the spindle 50. The at least one strain gauge 52, 54 can be mounted to an interior surface of the spindle 50 or an external surface of the spindle 50. Each strain gauge 52, 54 includes at least one grid 56, 58. Hence, at a minimum, the torque sensor 26 includes at least one grid 56, 58, where the at least one grid 56, 58 can be on a single strain gauge or on separate strain gauges for mounting. Further, each grid 56, 58 is arranged in a shear pattern on the spindle 50. In other words, each grid 56, 58 is arranged at either about positive or negative 45 degrees from an axis 60 of the spindle 50. About 45 degrees from the axis 60 of the spindle 50 typically means 37 to 53 degrees from the axis 60 of the spindle 50. As used herein a grid is also known as a strain gauge grid.

Typically, the torque sensor 26 includes a single pair of grids, as illustrated in FIGS. 3A and 3B. However, other embodiments are contemplated. For example, the torque sensor 26 can include a single grid. As another example, the torque sensor 26 can include a plurality of pairs of grids, such as two pairs of grids. With reference to FIG. 3B, each grid 56, 58 of the single pair is axially located on the spindle 50 radially positioned at about 180 degrees from the other grid (i.e., on opposite sides of the spindle 50) and the grids 56, 58 have the same orientation with respect to the axis 60. About 180 degrees from the other grid typically means 165 to 195 degrees from the other grid.

When the torque sensor 26 includes two pairs of grids, a first pair and a second pair, each of the pairs is positioned as done for the single pair, except that the first pair is positioned to measure positive strain and the second pair is positioned to measure negative strain for the same torsional load. Hence, for each of the first pair and the second pair, each grid of the pair is located on the spindle 50 axially positioned at about 180 degrees from the other grid (i.e., on opposite sides of the spindle 50) and the grids have the same orientation with respect to the axis 60. As noted above, about 180 degrees from the other grid typically means 165 to 195 degrees from the other grid. If the grids of the first pair are orientated at about positive 45 degrees from the axis 60 of the spindle 50, the grids of the second pair are oriented at about negative 45 degrees from the axis 60 of the spindle 50. If the grids of the first pair are orientated at about negative 45 degrees from the axis 60 of the spindle 50, the grids of the second pair are oriented at about positive 45 degrees from the axis 60 of the spindle 50.

The state of pure shear stress at the surface of a shaft (i.e., with no bending forces) is equivalent to equal tensile and compressive stresses on an element rotated through an angle of about 45 degrees. Therefore, a rectangular element with sides at about 45 degrees to the axis of the shaft will be submitted to tensile and compressive stresses. If a bar made of a material that is weaker in tension than in shear is twisted, failure will occur in tension along a helix inclined at about 45 degrees to the axis. This is easily observed by twisting a piece of chalk. Thus, a strain gage grid aligned at about 45 degrees to the axis of a shaft (i.e., in a shear pattern) will measure shear strain from the shear stress in a shaft subjected to torsion. Only one grid in a shear pattern is needed to measure torsional strain for a shaft in pure torsion.

If bending forces, with no torsion, are applied to a shaft having a grid at about 45 degrees to the axis, the grid may also measure axial strain from the axial stress from the bending force depending on location of the grid. This can be observed by placing two parallel circular marks around a cylindrical eraser and then applying a bending force to the eraser. The bending strain will be observed to vary from tensile to compressive by observing that the spacing between circular marks increases and decreases for the tensile and compressive strains respectively. One side of the eraser surface will be in tension, whereas the axially located side positioned radially opposite at about 180 degrees will be in compression. Close to about 90 degrees from maximum compression or tensile strain there will be no strain (i.e., the neutral axis).

In view of the foregoing, it should be appreciated that the grids 56, 58 measure shear strain (compressive or tensile stress) caused as the non-drive crank arm is rotated about the common axis 18. The grids 56, 58 also measure bending strain due to bending forces, which causes both axial compressive and tensional strain on opposite sides of the spindle 50 and which is exhibited as shear strain at about 45 degrees to the axis 60. As will be shown, when bending forces cannot be eliminated mechanically, two grids in a shear pattern properly located on a shaft and electrically connected in a Wheatstone bridge can measure just the torsional strain.

Figure 4:
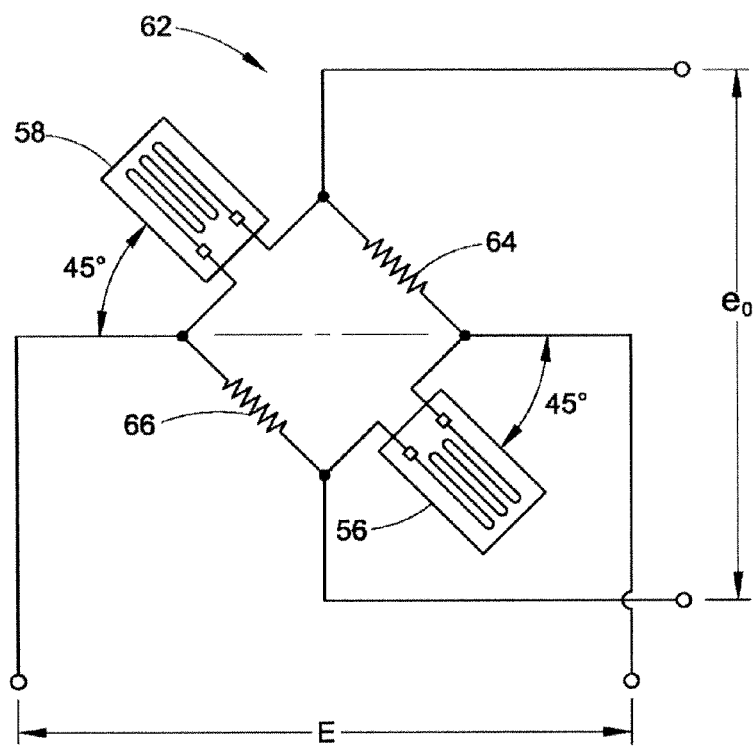
FIG. 4 is a schematic of a Wheatstone bridge.

With reference to FIG. 4, the grids 56, 58 of the single pair of grids are electrically connected in a Wheatstone bridge arrangement 62. Due to the physical arrangement of the grids 56, 58 on the spindle 50, strain measured in the grids 56, 58 due to bending forces result in subtractive voltages in the Wheatstone bridge arrangement 62, while the torsional strain measured by the grids 56, 58 from torsional forces result in additive voltages. In contrast, if the torque sensor 26 only included a single grid, torsional strain and bending forces, if present, would both be measured.

Each grid 56, 58 is connected in series with a resistor 64, 66, each resistor 64, 66 having a resistance equal to that of its corresponding grid 56, 58. The two series combinations of a grid and a resistor are connected in parallel, such that the grids 56, 58 are indirectly electrically connected to one another through the resistors 64, 66. An input voltage E, such as 3 Volts, is provided across the Wheatstone bridge arrangement 62. The output voltage $e_o$ is the voltage extending between the mid-points of the two series combinations and is proportional to torque. Theoretically, output voltage $e_o$ is not effected by bending strain. However, in practice, tolerances in gauge positioning cause the observance of some bending strain (if present). Nonetheless, 95% or more of the bending strain is typically cancelled. In some embodiments, the input and output to the Wheatstone bridge arrangement 62 terminate at electrical plugs.

The Wheatstone bridge arrangement 62 can also be employed for two pairs of grids. In such an embodiment, the resistors are replaced with the second pair of strain grids, which are of equal resistance as the first pair. Further, the output voltage $e_o$ is double what it would be with a single pair of strain grids.

Figure 5:
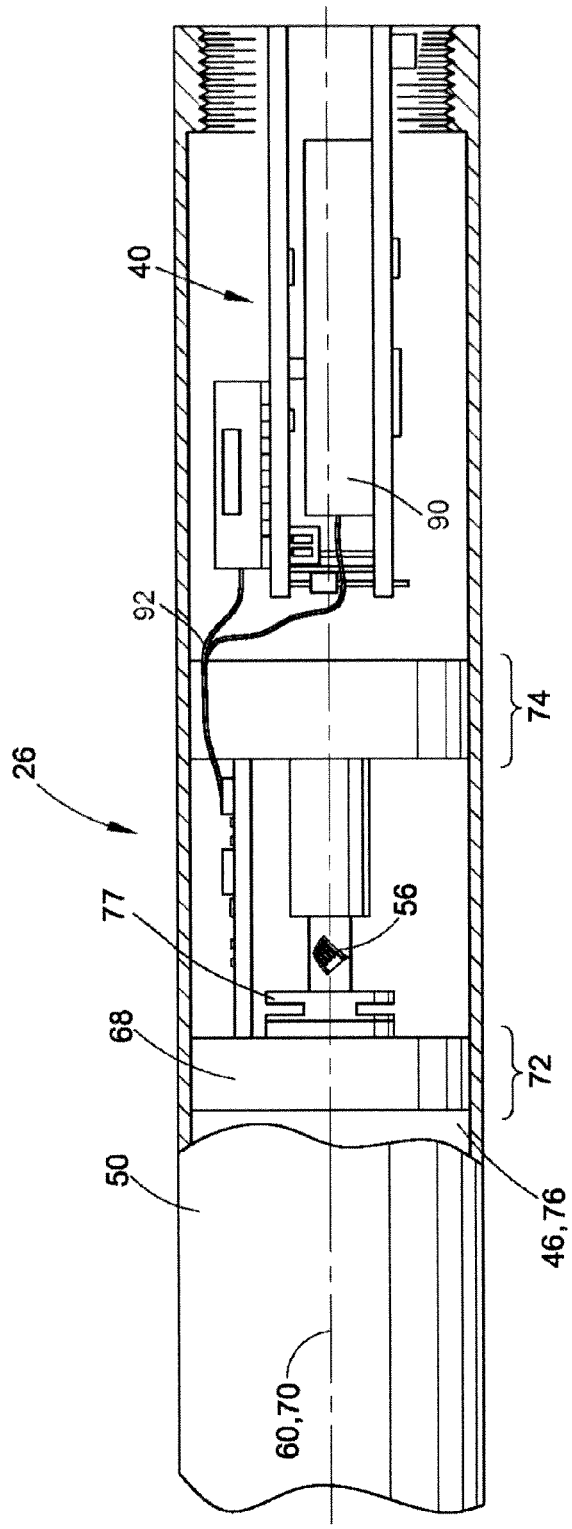
FIG. 5 is a perspective view of a torque sensor with a carrier according to aspects of the present disclosure.

With reference to FIG. 5, another embodiment of the torque sensor 26 includes a carrier 68 mounted to the spindle 50 within the hollow space 46 of the spindle 50. In contrast with the embodiment of FIGS. 3A and 3B, the at least one grid 56, 58 is mounted to the carrier 68, instead of the spindle 50. The strain gauge grids 56, 58 are mounted to the carrier 68 in the same manner as done for the spindle 50. Namely, the strain gauge grids 56, 58 are mounted in a shear pattern, where each strain gauge grid 56, 58 is about 45 degrees from an axis 70 of the carrier 68. About 45 degrees from the axis 70 of the carrier 68 typically means 37 to 53 degrees from the axis 70 of the carrier 68. Further, for a pair of grids, the grids are axial positioned at about 180 degrees from the other grid (i.e., on opposite sides of the carrier 68) and the grids have the same orientation with respect to the axis 70. About 180 degrees from the other grid typically means 165 to 195 degrees from the other grid. The electrical interconnection of the strain gauge grids 56, 58 remains the same as described above.

Any approach to fixing (i.e., mounting) the carrier 68 to the spindle 50, direct or otherwise, is acceptable, so long as the carrier 68 does not radially slip at areas 72, 74 to which the carrier 68 mounts to the spindle 50 while under torsional load during rotation of the crank arms 16. Direct approaches include one or more of pressing, swaging, threading, screwing, riveting, pinning, wedging, welding, epoxying, removably fastening, or the like. Removable fasteners include, for example, expanding bolts, set screws, or the like. Indirect approaches include mounting to another component of the human-propelled vehicle 10 that is torsionally coupled to the spindle 50, such as a crank arm bolt that directly fastens to the spindle 50, using one of the direct approaches noted above. As shown, the spindle 50 includes a smooth bore 76 within which the carrier 68 is inserted, and the carrier 68 is mounted to the spindle 50 at the areas 72, 74 by expansion. However, modifications to the spindle 50 and carrier 68 so as to facilitate mounting are contemplated. For example, one or both of the areas 72, 74 to which the carrier 68 mounts to the spindle 50 may be threaded for mounting the carrier 68 to the spindle 50.

Strain gauges, especially of the resistant type, have known cyclic fatigue limits as a function of strain, whereby they require that the strain be limited. The torsional stiffness (angle of twist per unit of torque) of either the spindle 50 or the carrier 68 is proportional to the Ip (polar moment of inertia), G (shear modulus of elasticity), and L (length). Therefore, angle of twist per unit length is based on Ip×G. G is dependent on material properties, and Ip is dependent on geometry. With proper design of the spindle 50, the strain can be kept below the fatigue limit. In a like manner, the strain on the carrier 68 can also be held below fatigue limits.

An advantage to using the carrier 68 is that the carrier 68 need not have to carry bending loads, since the carrier 68 can be designed to include a coupling 77 which supports and transmits torsional loads (strain from torsion) but not bending loads. The carrier 68 can be designed to flex due to bending loads similar to couplings that have zero backlash (i.e., a bellows, universal joint, flexible shaft or the like). The benefit is that misalignment of the strain grids 56, 58 on the carrier 68, as well as of the mounting to the carrier 68 to the spindle 50, is much less sensitive to mechanical tolerances, thereby achieving a more accurate measurement of torque in the spindle 50. In addition, the spindle 50 may undergo high bending loads, while the carrier 68, if located interior to the spindle 50, will undergo very little bending load since then it will be located along the neutral axis of the spindle 50 where bending strain is near zero. Note that bending strain is always positive on one side of the spindle 50, but negative on the other, and thus must be zero at the neutral axis.

While the spindle 50 has been shown and described as hollow thus far, it is to be appreciated that the spindle 50 can be solid or at least partially solid. For example, a portion of the spindle 50 upon which the at least one strain gauge 52, 54 is mounted can be solid, whereas the remaining portion of the spindle 50 can be hollow. The crank arms 16 can then be mounted to the hollow portions of the spindle 50.

Figure 6:
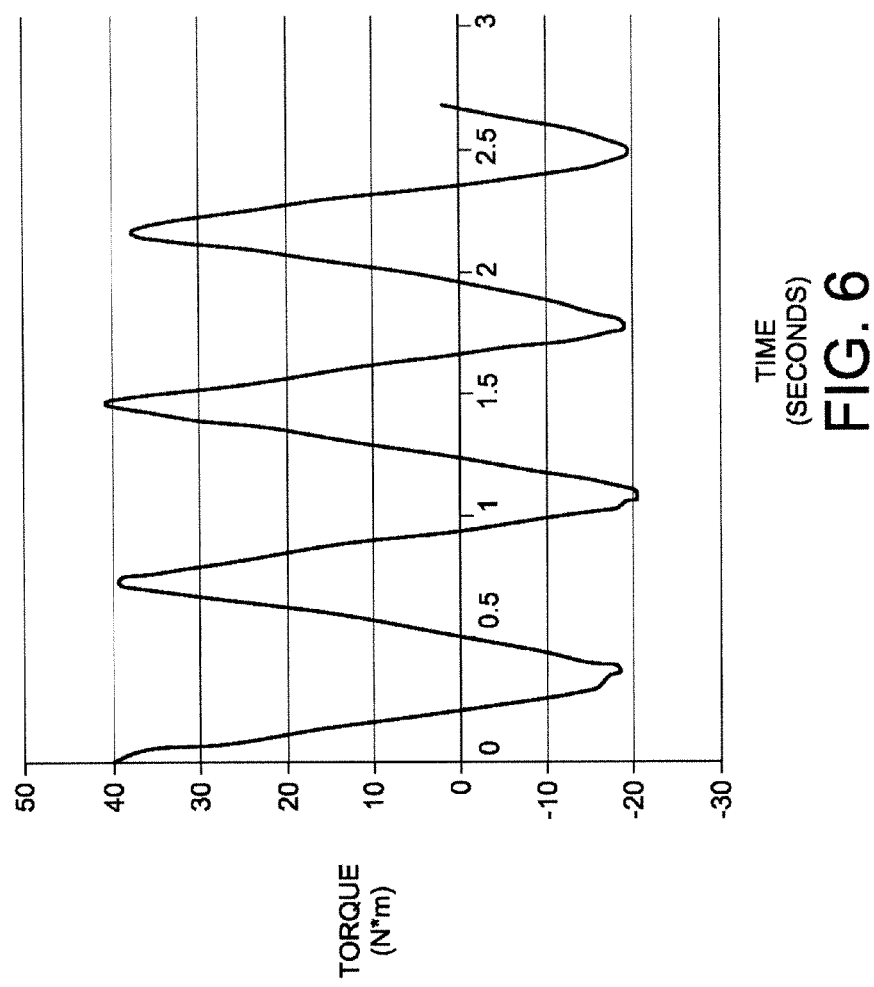
FIG. 6 is a graph illustrating the output of a torque sensor.

With reference to FIG. 6, a graph illustrates the output of the torque sensor 26 after amplification. The ordinate corresponds to torque, and the abscissa corresponds to time. As can be seen, there is peak torque during revolution of the spindle 50, and peak-to-peak corresponds to one revolution. Angular velocity can therefore be determined based on the observing torque as a function of time. Since power is the product of torque and angular velocity, power can also be determined.

Figure 7:
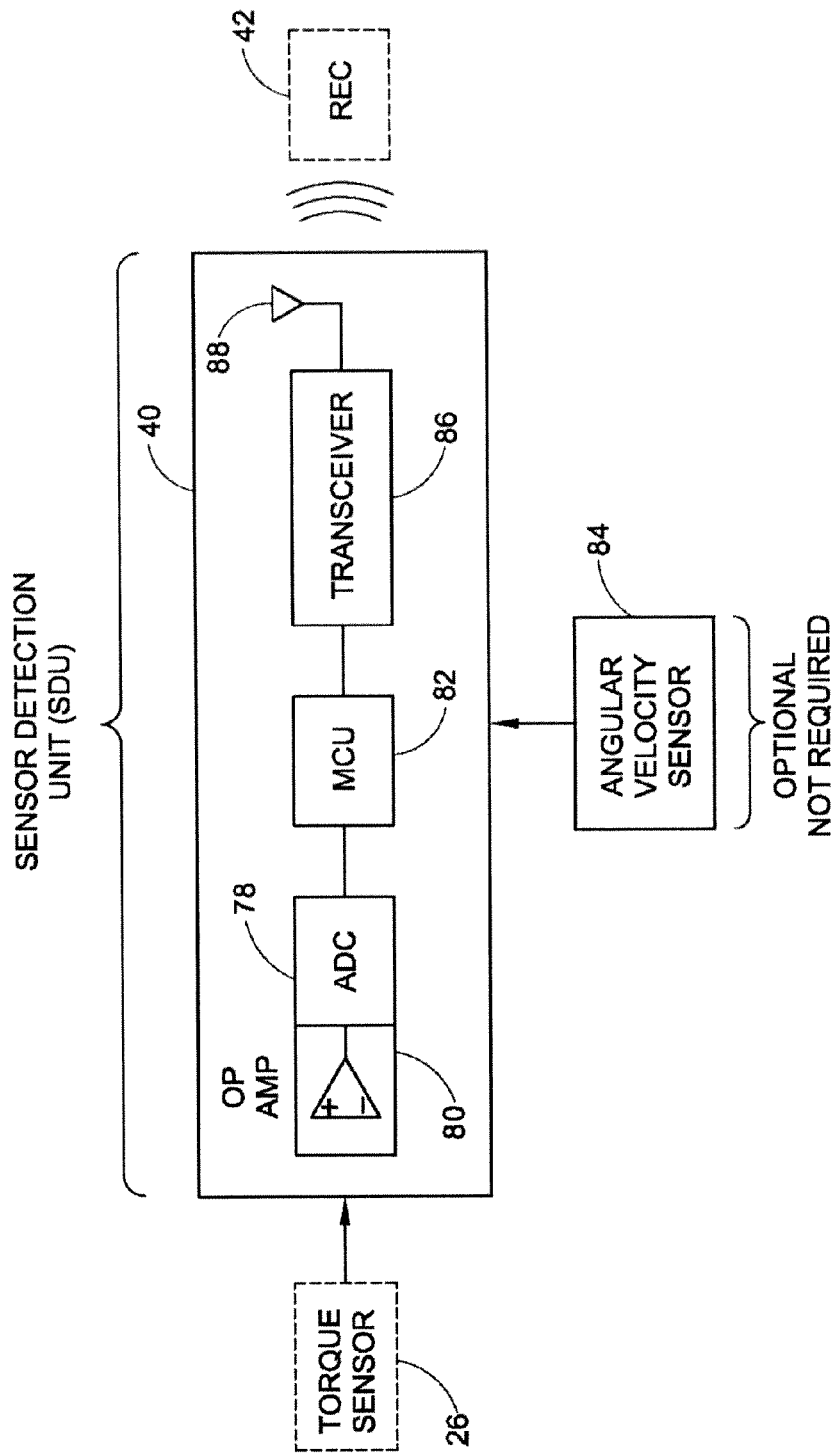
FIG. 7 is a block diagram of a sensor detection unit according to aspects of the present disclosure.

With reference to FIG. 7, an embodiment of the sensor detection unit (or power measuring unit) 40 includes an analog-to-digital converter 78 that receives the output from the torque sensor 26 and converts it into digital data. In some embodiments, the sensor detection unit 40 further includes an operational amplifier 80 for amplifying the output of the torque sensor 26 before it passes to the analog-to-digital converter 78. The operational amplifier 80 can be integrally formed with the analog-to-digital converter 78 or be separate. A microcontroller 82 of the sensor detection unit 40, optionally integrated with the analog-to-digital converter 78, receives the digital data. In some embodiments, the microcontroller 82 further receives data from an angular velocity sensor 84. As with the torque sensor 26, this data may be passed through an analog-to-digital converter (not shown).

In some embodiments, the angular velocity sensor 84 determines angular velocity by detecting position as a function of time, such as a reed or Hall effect switch and magnet or some form of an encoder with a predetermined number of counts that may be used with a counter and timer. Alternatively, in some embodiments, the angular velocity sensor 84 determines angular velocity by reverse calculating velocity and position using acceleration data from an accelerometer. Alternatively, in some embodiments, a gyroscope (not shown), such as those that utilize the Coriolis principle, is used to detect angular velocity measurement. This provides redundancy and additional accuracy in the power meter measurement and calculation. Another advantage to using the gyroscope is the power measurement is improved, especially at lower cadence, when there is a larger variation in angular velocity in the pedal stroke.

The microcontroller 82, using the digital data from the torque sensor 26 and, optionally, the angular velocity sensor 84, calculates power from the non-drive crank arm. A processor of the microcontroller executes processor executable instructions on a memory that perform the calculations. As noted above, power is the product of torque and angular velocity. Therefore, where data is received from the angular velocity sensor 84, power is simply the product of the current torque and the current angular velocity. Where an angular velocity sensor does not exists, angular velocity is determined by observing torque as a function of time, shown in FIG. 6. For example, the number of cycles (peak-to-peak) per unit of time, such as seconds or minutes, is counted using a clock of the microcontroller 82. Power is then the product of angular velocity, as determined by counting the number of cycles per unit of time, and current torque.

The torque sensor 26 measures only the torque applied to the non-drive crank arm. Therefore, the microcontroller 82 typically multiples the calculated power by two. Multiplying by two is sufficient for power calculations for the majority of operators since the power applied by the two human limbs to the two crank arms 16 is generally the same. For situations where this is insufficient, the sensor detection unit 40 permits the measurement of power from both crank arms by using another power meter or possibly another torque sensor with a modified spindle and spider arrangement. As to the former, the microcontroller 82 can receive total power measurements from the other power meter. Power at the non-drive crank arm can be calculated using the torque sensor 26 and power at the drive crank arm 34 can be calculated by subtracting the non-drive crank arm power from the total power received from the other power meter. Advantageously, for those operators who have power meters that only provide total power, better resolution of the power at each crank arm can be obtained through use in combination with the torque sensor 26.

After calculating total power and, optionally power for each crank arm, the calculated power and, optionally the data used to calculate power, are transmitted to the receiving device 42 using a transceiver 86. Suitably, the transceiver 86 is a wireless transceiver making use of an antenna 88. However, the transceiver 86 can be connected to the receiving device 42 over a wired connection, such as a USB connection. In some embodiments, the transceiver 86 is also employed to receive firmware and/or firmware updates (i.e., processor executable instructions or updates to the processor executable instructions) for the microcontroller 82 of the sensor detection unit 40.

Referring back to FIG. 5, the sensor detection unit 40 is shown within the spindle 50. This is to be contrasted with the positioning of the sensor detection unit 40 shown in FIG. 1. Further, as shown, the sensor detection unit 40 and the torque sensor 26 receive power from a battery 90. Power is transferred from the battery 90 to the sensor detection unit 40 and the torque sensor 26 over a cable 92, such as a ribbon cable. The cable 92 also carries data between the torque sensor 26 and the sensor detection unit 40. In other embodiments, separate data and power cables can be employed.

One advantage of the torque sensor 26 disclosed herein is that strains from bending can be measured and negated from strains due to compression and tension caused by torque applied to the spindle. Further, power can be computed by reviewing torque as a function of time. The torque sensor 26 disclosed herein is simple and low cost. It has only a reduced number of components because the components are separated, there is easier trouble shooting and lessened repair costs. Further, a bike can be made "power meter ready". Moreover, an off-the-shelf bicycle bottom bracket can be retrofitted.

The present disclosure has been described with reference to the preferred embodiments. Obviously, modifications and alterations will occur to others upon reading and understanding the preceding detailed description. For example, it should be appreciated that other types of human propelled vehicles could also employ the torque sensor disclosed herein. So too could a variety of other objects, such as hand tools and other products. It is intended that the recent disclosure be construed as including all such modifications and alterations insofar as they come within the scope of the appended claims or the equivalents thereof.

The invention claimed is:

1. A torque sensor comprising:
   a carrier which can be mounted to an associated spindle connected to at least one crank arm of an associated torqued object;
   a first strain gauge grid mounted to the carrier in a shear pattern to measure shear strain in a direction perpendicular to a radius of the associated spindle; and
   a second strain gauge grid mounted to the carrier and sharing a common orientation with the first strain gauge grid, the common orientation being about 45 degrees from an axis of the carrier, wherein the first strain gauge grid and the second strain gauge grid are located radially opposite from each other.

2. The torque sensor according to claim 1, wherein the carrier is fixed to a hollow interior of the associated spindle.

3. The torque sensor according to claim 1, wherein the carrier mechanically flexes due to bending forces from the associated spindle whilst torsionally straining from torque forces transmitted from the associated spindle.

4. The torque sensor according to claim 1, further including:

a second pair of strain gauge grids mounted to the carrier in a shear pattern to measure shear strain in a direction perpendicular to a radius of the associated spindle.

5. The torque sensor according to claim 1, wherein the strain gauge grid and the second strain gauge grid are electrically connected in a Wheatstone bridge arrangement to output a voltage proportional to shear strain caused by torsional forces.

6. A power measuring unit comprising:
a torque sensor comprising:
a carrier which can be mounted to an associated spindle connecting crank arms of a human-powered object;
a first strain gauge grid mounted to the carrier in a shear pattern to measure shear strain from torsional forces;
a second strain gauge grid mounted to the carrier and sharing a common orientation with the first strain gauge grid, the common orientation being about 45 degrees from an axis of the carrier, wherein the first strain gauge grid and the second strain gauge grid are located radially opposite from each other; and
a processor programmed to:
receive strain data from the torque sensor;
measure torque from the received strain data; and
provide power data calculated from the measured torque to a receiving device.

7. The power measuring unit according to claim 6, wherein the measured torque is multiplied by two for power data calculations.

8. The power measuring unit according to claim 6, wherein the power data is wirelessly provided to the receiving device.

9. The power measuring unit according to claim 6, wherein the processor is further programmed to:
receive angular velocity data from an angular velocity sensor, wherein the power data is calculated from the measured torque and the angular velocity data.

10. The power measuring unit according to claim 9, wherein the angular velocity sensor includes a gyroscope.

11. The power measuring unit according to claim 6, wherein the power measuring unit is disposed in a hollow interior of the associated spindle.

12. The power measuring unit according to claim 6, wherein the first-strain gauge grid and the second strain gauge grid are electrically connected in a Wheatstone bridge arrangement to measure the shear strain from torsional forces whilst negating shear strain from bending forces.

13. A torque sensor comprising:
a shaft; and,
a pair of strain gauge grids mounted to the shaft such that they are located radially opposite from each other in a shear pattern and sharing a common orientation with each other to measure shear strain in a direction perpendicular to a radius of the shaft and electrically connected in a Wheatstone Bridge arrangement to measure shear strain from torsional forces whilst negating shear strain from bending forces, wherein the common orientation is about 45 degrees from an axis of the shaft.

14. The torque sensor according to claim 13, wherein a portion of the shaft is hollow.

15. The torque sensor according to claim 13, wherein the shaft is associated with one or more crank arms torqueing the shaft.

16. A bicycle comprising:
a pair of crank arms connected by a spindle; and,
a torque sensor comprising:
a first strain gauge oriented to measure strain at 45 degrees to an axis of the spindle and perpendicular to a radius of the axis; and
a second strain gauge grid sharing a common orientation with the first strain gauge grid, the common orientation being about 45 degrees from the axis, and wherein the first strain gauge grid and the second strain gauge grid are located radially opposite from each other.

17. The bicycle according to claim 16, wherein the first strain gauge grid and the second strain gauge grid are electrically connected in a Wheatstone bridge arrangement to measure shear strain from torsional forces whilst negating shear strain from bending forces.

18. The bicycle according to claim 16, wherein the torque sensor further includes:
a carrier coaxially aligned with, and mounted to, the spindle, wherein the strain gauge is mounted to the carrier.

19. The bicycle according to claim 16, wherein the carrier is mounted in a hollow interior of the spindle.

* * * * *